(12) United States Patent
Kramer

(10) Patent No.: US 11,387,682 B1
(45) Date of Patent: Jul. 12, 2022

(54) WIRELESS CHARGING ANTENNA ARRAYS WITH ENHANCED COIL UNIFORMITY AND METHODS OF PRODUCING THE SAME

(71) Applicant: THE DILLER CORPORATION, Cincinnati, OH (US)

(72) Inventor: Robert Jacob Kramer, Franklin, OH (US)

(73) Assignee: THE DILLER CORPORATION, Cincinnati, OH (US)

( * ) Notice: Subject to any disclaimer, the term of this patent is extended or adjusted under 35 U.S.C. 154(b) by 170 days.

(21) Appl. No.: 16/929,380

(22) Filed: Jul. 15, 2020

Related U.S. Application Data

(60) Provisional application No. 62/874,266, filed on Jul. 15, 2019.

(51) Int. Cl.
| | |
|---|---|
| *H02J 50/40* | (2016.01) |
| *H01Q 21/00* | (2006.01) |
| *H02J 50/20* | (2016.01) |
| *H01Q 1/38* | (2006.01) |

(52) U.S. Cl.
CPC .............. *H02J 50/40* (2016.02); *H01Q 1/38* (2013.01); *H01Q 21/0025* (2013.01); *H02J 50/20* (2016.02)

(58) Field of Classification Search
CPC . H02J 50/40; H02J 50/20; H01Q 1/38; H01Q 21/0025; H01Q 21/00
See application file for complete search history.

(56) References Cited

U.S. PATENT DOCUMENTS

2019/0363565 A1* 11/2019 Graham .................... H02J 7/02

* cited by examiner

*Primary Examiner* — Robert L Deberadinis
(74) *Attorney, Agent, or Firm* — Flaster Greenberg, P.C.

(57) ABSTRACT

Antenna array comprising: (i) a first conductive trace having a first cross-sectional area; (ii) a second conductive trace having a second cross-sectional area; (iii) an interposing insulating member having a first surface and an opposing second surface; and (iv) wherein the second cross-sectional area is less than the first cross-sectional area. Methods comprising: (i) providing a first insulating member; (ii) patterning a first conductive trace on the first insulating member; (iii) providing a second insulating member; (iv) patterning a second conductive trace on the second insulating member; (v) stacking and compressing the first insulating member, the second insulating member and a third insulating member; and (vi) where the first conductive trace has a cross-sectional area that is greater than a cross-sectional area of the second conductive trace.

26 Claims, 7 Drawing Sheets

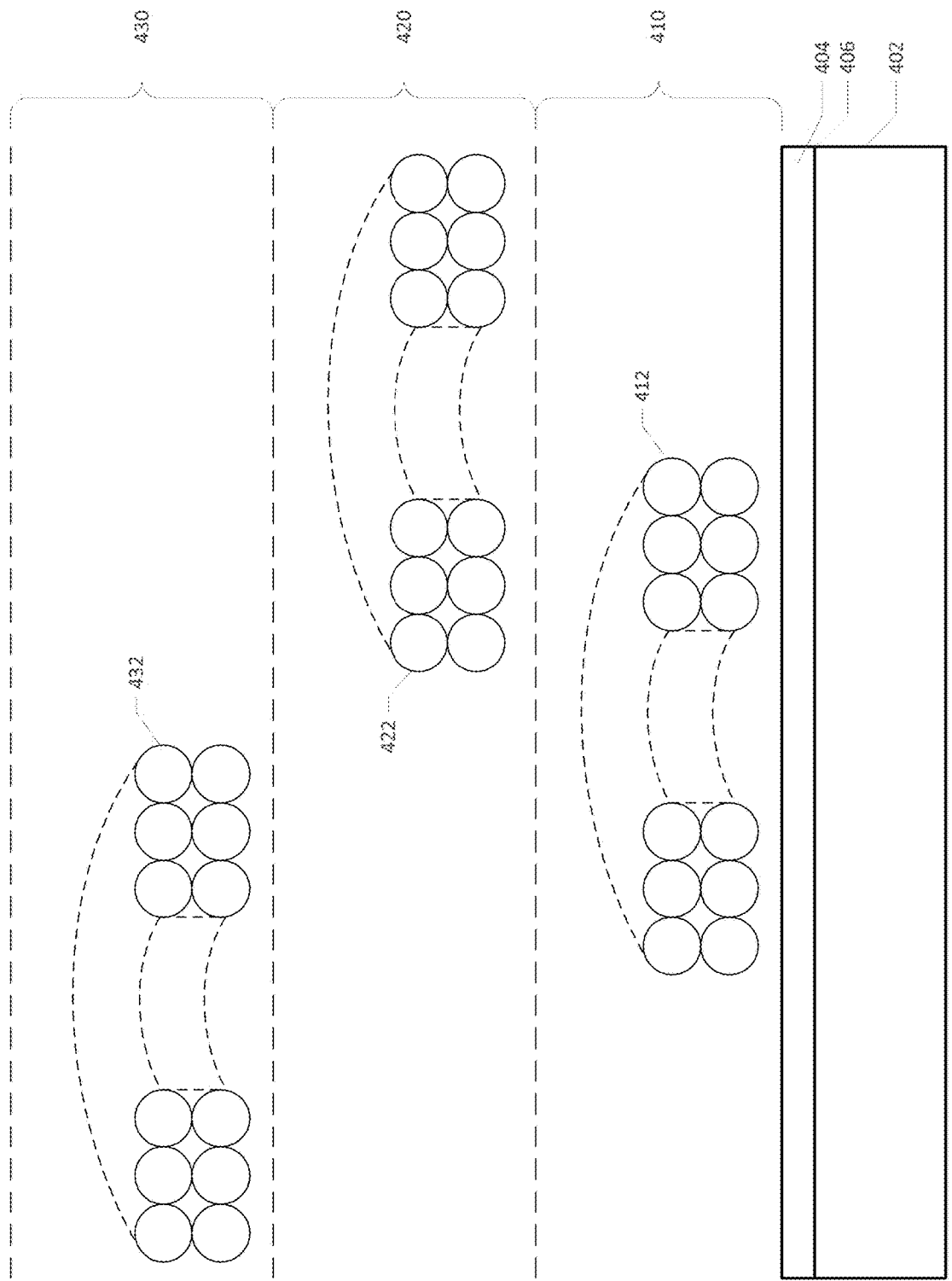

WIRELESS CHARGING ANTENNA ARRAYS WITH ENHANCED COIL UNIFORMITY AND METHODS OF PRODUCING THE SAME

CROSS-REFERENCE TO RELATED APPLICATIONS

This application claims the benefit of U.S. Provisional Patent Application No. 62/874,266, filed Jul. 15, 2019, the entire contents of which are hereby incorporated herein by reference.

BACKGROUND OF THE INVENTION

Over the last several years, society has seen a proliferation of over-the-air or wireless power transmission for charging portable, rechargeable electronic devices. An approach to such wireless energy transmission is based on inductive coupling between a transmit antenna embedded in, for example, a "charging mat" or other surface, and a receiver antenna (and a rectifying circuit) embedded in the host electronic device to be charged, such as, for example, a mobile telephone. However, the "charging mats" and other surfaces for wireless energy transmission require a cord to be plugged into an AC wall outlet and often have small charging surface areas, which require accurate placement of the host device to be charged. As such, approaches have been developed to provide expansive surfacing, such as, for example, kitchen countertops, table tops, vanity tops, and the like, capable as serving as a platform for wireless energy transmission via inductive coupling to host devices.

When wireless energy transmitters are incorporated into expansive surfacing, the system can be designed to blend into the normal design of the surfacing, i.e., to be as non-disruptive as possible. The blending of the wireless energy transmitter into the surface can allow the surface to keep its normal aesthetics. However, objects other than the intended host device can be placed on the transmitters at times. Therefore, transmitters are generally designed to sense when a receiver for an intended host device to be charged is brought within range of the transmitter. This can be achieved by applying low energy pulses to the oscillating circuit of the transmitter and measuring the dissipation time, which is dependent, in part, on the magnetic permeability of the air/space around the coil. For example, placing an object, such as a piece of metal or alternatively a less conductive material, near the transmitter changes the magnetic permeability such that dissipation time is either decreased or increased. That is, highly conductive materials, such as metals, can decrease dissipation time, whereas less conductive materials can increase dissipation time. Receiver antennae in host devices are constructed such that their electrical and magnetic signature is different from other common objects, which allows for the calculation of an expected change in dissipation time when a specific receiver antenna is within range of a transmitter. Such device recognition allows for full power transmission to be activated only when a device to be charged is present.

BRIEF SUMMARY OF THE INVENTION

The various embodiments of the present invention is directed, in general, to antenna arrays. More particularly, the various embodiments of the present invention are directed to roughly planer antenna arrays. That is, as used herein, the term "antenna array" refers to an array of antennae that are substantially larger in two dimensions than in the third dimension, i.e., roughly planar. Various embodiments of the present invention thus provide antenna arrays including conductive traces. In the various embodiments of the present invention, an antenna array having multiple conductive traces is disclosed where the array is improved by selectively reducing the cross-sectional area of certain conductive traces. In addition to balancing the properties of the conductive traces across the array, significant cost reductions can be achieved as less conductive material (e.g., silver foils or silver-containing conductive inks) is required.

One embodiment of the present invention includes an antenna array comprising: (i) a first conductive trace having a first cross-sectional area; (ii) a second conductive trace having a second cross-sectional area; (iii) an interposing insulating member having a first surface and an opposing second surface; and (iv) wherein the second cross-sectional area is less than the first cross-sectional area. Another embodiment of the present invention includes wherein the first and second conductive traces comprise meandering lines selected from the group consisting of spirals, spirangles, sawtooth waves, and combinations thereof. Another embodiment of the present invention includes wherein at least a portion of the second conductive trace overlaps at least a portion of the first conductive trace when viewed orthogonal to the first and second surfaces. Another embodiment of the present invention includes an antenna array additionally comprising: (a) at least one additional conductive trace, each having an additional cross-sectional area; (b) wherein at least a portion of the second conductive trace and at least a portion of each of the at least one additional conductive traces overlaps at least a portion of the first conductive trace when viewed orthogonal to the first and second surfaces; and (c) wherein each additional cross-sectional area is less than the first cross sectional area. Another embodiment of the present invention includes where the second conductive trace and each of the at least one additional conductive traces are disposed such that they overlap the first conductive trace substantially equally. Another embodiment of the present invention includes where each of the first, second, and additional conductive traces includes a center point and where the center points of the second and additional conductive traces are located on a circle having the first conductive trace center point as its center. Another embodiment of the present invention includes wherein the at least one additional conductive trace comprises three conductive traces that are located at 90 degree intervals around the circle. Another embodiment of the present invention includes wherein the at least one additional conductive trace comprises five additional conductive traces. Another embodiment of the present invention includes wherein each additional cross-sectional area and the second cross-sectional area are about 1% to 60% less than the first cross-sectional area. Another embodiment of the present invention includes wherein each additional cross-sectional area and second cross-sectional area are about 15% to about 25% less than the first cross-sectional area. Another embodiment of the present invention includes wherein each additional cross-sectional area and second cross-sectional area are about 21% to about 25% less than the first cross-sectional area. Another embodiment of the present invention includes wherein each additional cross-sectional area and second cross-sectional area are about 17% to about 21% less than the first cross-sectional area. Another embodiment of the present invention includes where the differences in cross-sectional are is effected by a difference in the cross-sectional area thickness of the conductive traces. Another embodiment of the present invention includes the antenna array further including a base layer having opposing first and second surfaces where the first conductive trace is in facing communication with the first surface of the base layer and the second surface comprises an enhancer material having a magnetic permeability ($\mu_i$) of about 3000 μH or more. Another embodiment of the present invention includes where the enhancer material is a soft ferrite material. Another embodiment of the present invention includes where the conductive traces comprise a metal foil. Another embodiment of the present invention includes where the conductive traces comprise printed conductive ink.

In various other embodiments of the present invention, a method of forming a wireless charging array is disclosed, the method comprising: (i) providing a first insulating member having a first surface and an opposing second surface; (ii) patterning a first conductive trace on the second surface of the first insulating member; (iii) providing a second insulating member having a first surface and an opposing second surface; (iv) patterning a second conductive trace on the second surface of the second insulating member; (v) stacking and compressing the first insulating member, the second insulating member and a third insulating member such that the first conductive trace is disposed between the second surface of the first insulating member and the first surface of the second insulating member, and the second conductive trace is disposed between the second surface of the second insulating member and the third insulating member; and (vi) where the first conductive trace has a cross-sectional area that is greater than a cross-sectional area of the second conductive trace. Another embodiment of the present invention includes wherein the first insulating member and the second insulating member each comprises a resin impregnated layer. Another embodiment of the present invention includes providing an enhancer material disposed on the first surface of the first insulating member. Another embodiment of the present invention includes where the enhancer material comprises a soft ferrite.

Other aspects, features and advantages will be apparent from the following disclosure, including the detailed description, preferred embodiments, and the appended claims.

BRIEF DESCRIPTION OF SEVERAL VIEWS OF THE DRAWINGS

The foregoing summary, as well as the following detailed description of various embodiments of the invention, will be better understood when read in conjunction with the appended drawings. For purposes of illustration of the invention, there are shown in the drawings certain embodiments. It should be understood, however, that the invention is not limited to the precise arrangements and instrumentalities shown.

In the drawings:

FIG. 4 is a cross sectional view of an example multi-coil array in accordance with the present disclosure;

DETAILED DESCRIPTION OF THE INVENTION

Figure 1A:
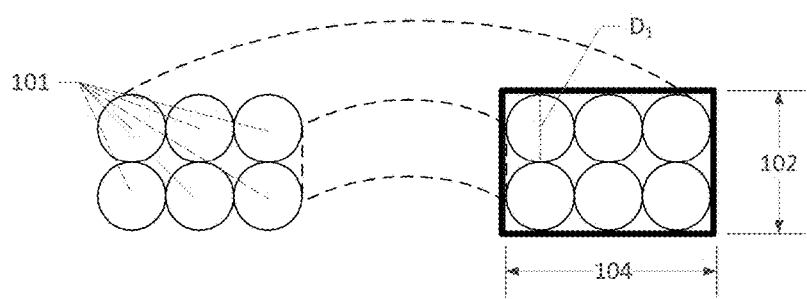
FIG. 1A-1H are cross-sectional views of example coils in accordance with the present disclosure.
Figure 1B:
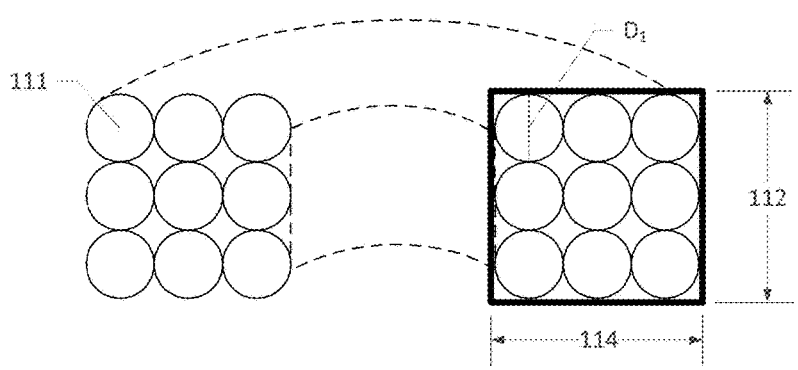
Figure 1C:
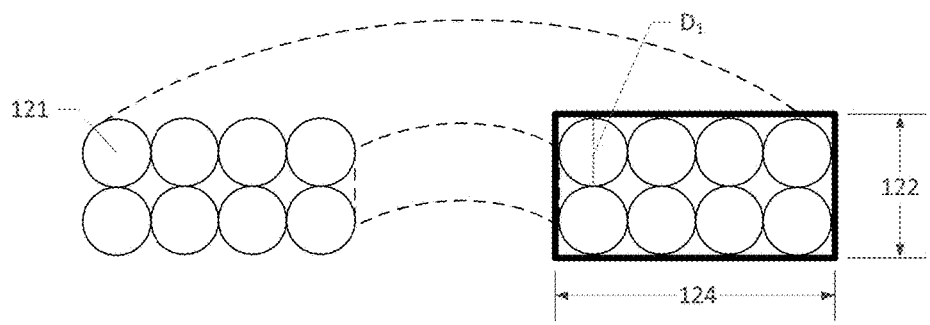
Figure 1D:
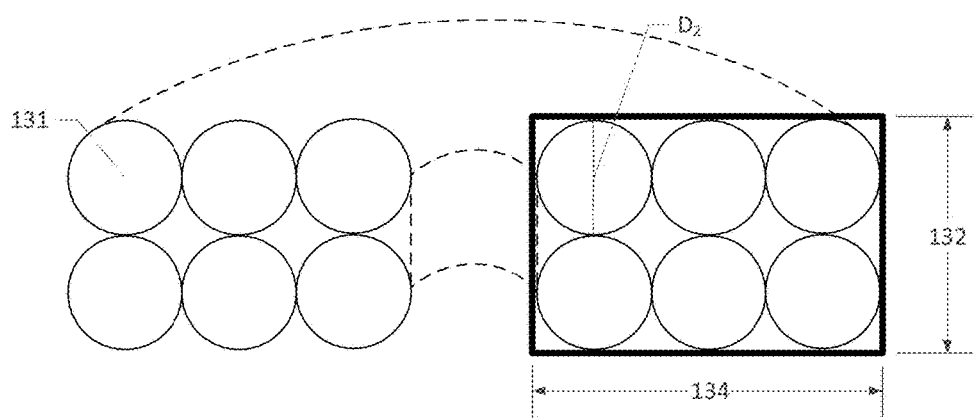

As used herein, the singular terms "a" and "the" are synonymous and used interchangeably with "one or more" and "at least one," unless the language and/or context clearly indicates otherwise. Accordingly, for example, reference to "a conductive trace" or "the conductive trace" herein or in the appended claims can refer to a single conductive trace or more than one conductive trace. Additionally, all numerical values, unless otherwise specifically noted, are understood to be modified by the word "about."

For simplicity and clarity of illustration, elements in the figures are not necessarily to scale, and the same reference numbers in different figures denote the same elements.

Certain terminology is used in the following description for convenience only and is not limiting. The words "right", "left", "lower", and "upper" designate directions in the drawing to which reference is made. The words "inwardly" and "outwardly" refer direction toward and away from, respectively, the geometric center of the object described and designated parts thereof. The terminology includes the words above specifically mentioned, derivatives thereof and words of similar import.

Wireless energy transmitters are often made of conductive materials formed in a geometric pattern, such as, for example, a conductive trace formed into a coil. The transmitter property understood to be most directly related to dissipation time is known as the quality factor ("Q factor") of the transmitter. When a wireless energy transmitter includes multiple transmitter component parts working in concert, such as multiple, layered coils, each individual component has its own Q factor. The individual component with the lowest Q factor is the limiting factor for the entire system, and therefore other individual components with higher Q factors are effectively over specified, resulting in waste.

Various examples of the present disclosure are directed to antenna arrays intended for use as transmitters for wireless energy transmission (e.g., wireless charging of rechargeable devices) that are embedded in surfacing materials, for example, as described in U.S. Pat. No. 9,881,727, issued on Jan. 30, 2018 to Kevin Francis O'Brien et al., which is hereby incorporated by reference in its entirety. In general, the antenna arrays include two or more conductive traces configured for current to pass through. The conductive traces can be disposed on separate layers to form a laminate of various conductive trace patterns. Methods of forming the conductive traces include, for example, the use of metal foils, such as on printed circuit boards, and printed conductive inks. Methods and formulations used to form printed conductive inks on various substrates are described in Published U.S. Pat. App. No. 2018/0298220 A1, the entire contents of which are incorporated herein by reference. The conductive traces can be meandering lines formed into a variety of non-limiting shapes, such as spirals, coils, spirangles, sawtooth waves, and combinations thereof. In some examples, the meandering lines are shaped to be symmetrical. The word "coil" is used throughout this disclosure to describe the conductive traces and unless specified otherwise, refers to any of the meandering line shapes in which the conductive traces can be formed. The coils can be arranged in various geometric and spatial relationships in the antenna array, of which two particular relationships are particularly relevant to the present disclosure: coil overlap (see discussion of FIGS. 2 and 3, below) and coil layer (see discussion of FIG. 4, below).

Referring to FIG. 1A-D, a series of coil cross-sections are depicted. As previously discussed, the Q factor of each coil is the coil property most directly related to dissipation time—which is used to determine whether an intended host device for charging is within range of the array. The Q factor of a coil depends, in large part, on the resistance of the coil. The resistance of the coil is directly related to the cross-sectional area of the coil winding. When the cross-sectional area of the coil is increased, the Q factor for that coil is also increased. In the present disclosure, some example coils are made of numerous windings, which may be connected to other windings in parallel or in series. For example, the coil depicted in FIG. 1A is composed of six windings 101. To measure the cross-sectional area of a coil winding, the cross-sectional area of the winding is measured. To measure the average cross-sectional area of the coil, the cross-sectional area of each winding is determined and the average cross-sectional area of the coil is the sum of the cross-sectional area for each winding, divided by the number of windings:

$$\sum_{i=1}^{n} A_i / n$$

where "$A_i$" is the cross-sectional area of winding i and "n" is the total number of windings. Where a coil consists of a single winding, or several windings connected in series, the average cross-sectional area of the winding or windings connected in series is the value of interest. Where a coil consists of multiple windings connected in parallel, the average cross-sectional area of each of the parallel connected windings added to one another is the value of interest. For example, in FIG. 1A, the cross-section of each winding is circular and has a diameter $D_1$. The cross-sectional area of each winding is therefore $\pi(D_1/2)^2$. There are six windings in FIG. 1A. Where the six windings are connected in series, the average cross-sectional area of the coil is $\pi(D_1/2)^2/6$. Where the six windings are connected in parallel, the cross-sectional area of the coil is $\pi(D_1/2)^2*6$. In other examples, a more approximated cross-sectional area may be determined. Using FIG. 1A as an example where the windings are connected in series, this more approximated cross-sectional area is the area of the rectangle defined by the total winding thickness 102 (which is equivalent to the diameter $D_1$ of two windings 101) (where thickness is measured in a direction normal to the surface on which the coil/winding is disposed) and the total winding width 104 (which is equivalent to the diameter $D_1$ of three windings 101), divided by six.

Figure 1E:
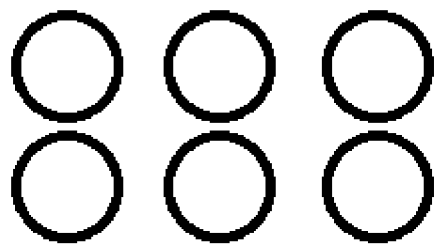
Figure 1F:
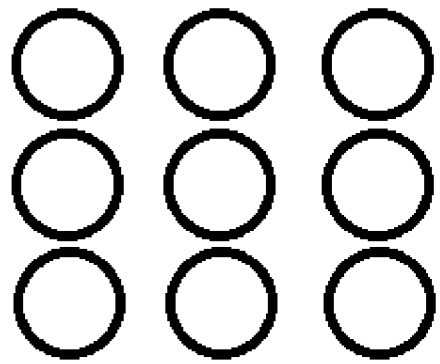
Figure 1G:
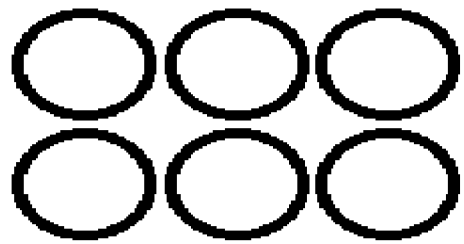
Figure 1H:
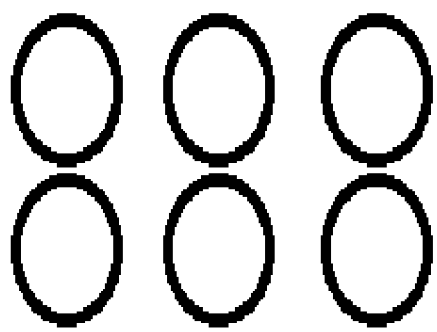

The cross-sectional area of a coil can be increased in a variety of ways. In some examples, the cross-sectional area of a coil can be increased by increasing the total winding thickness of the coil by wiring multiple windings in parallel. For example, in FIG. 1B, the winding 111 diameter $D_1$ is the same as that of the winding of the coil in FIG. 1A but an extra layer of windings 111 is included and connected to the other winding in parallel, increasing the total winding cross-sectional area by adding the average cross-sectional area of winding 111 to the average cross-sectional area of the coil winding in FIG. 1A. In other examples, the cross-sectional area of a coil can be increased by increasing the winding width. For example, in FIG. 1C, the winding 121 diameter $D_1$ is the same as that of the coil in FIGS. 1A and 1B but an extra winding 121 is included in parallel, increasing the total winding width 124 and total cross-sectional area of the windings, while the total winding thickness 122 remains the same as the coil in FIG. 1A. In other examples, the cross-sectional area of a coil can be increased by increasing the cross-sectional area of an individual winding. For example, in FIG. 1D, the winding 131 diameter $D_2$ is increased such that it is larger than the winding diameter $D_1$ of the windings 101, 111, 121 in FIGS. 1A, 1B, and 1C. In such an example, both the total winding thickness 132 and total winding width 134 is increased compared to those of the coil in FIG. 1A. The various methods of increasing coil cross-sectional area discussed above can be used individually (e.g., increase total winding width but not total winding thickness or winding diameter) or in tandem (e.g., increase total winding width and total winding thickness but not winding diameter). For example, referring to FIG. 1E, a coil comprised of one winding with six loops is shown in cross-section. The total cross-sectional area of the coil can be increased, as shown in FIG. 1F, by adding a winding connected in parallel to the winding shown in FIG. 1E. Alternatively, or in addition, the total cross-sectional area of the coil can be increased, as shown in FIG. 1G, by increasing the width of the winding shown in FIG. 1E. Alternatively, or in addition, the total cross-sectional area of the coil can be increased, as shown in FIG. 1H, by increasing the thickness of the winding shown in FIG. 1E.

Figure 2:
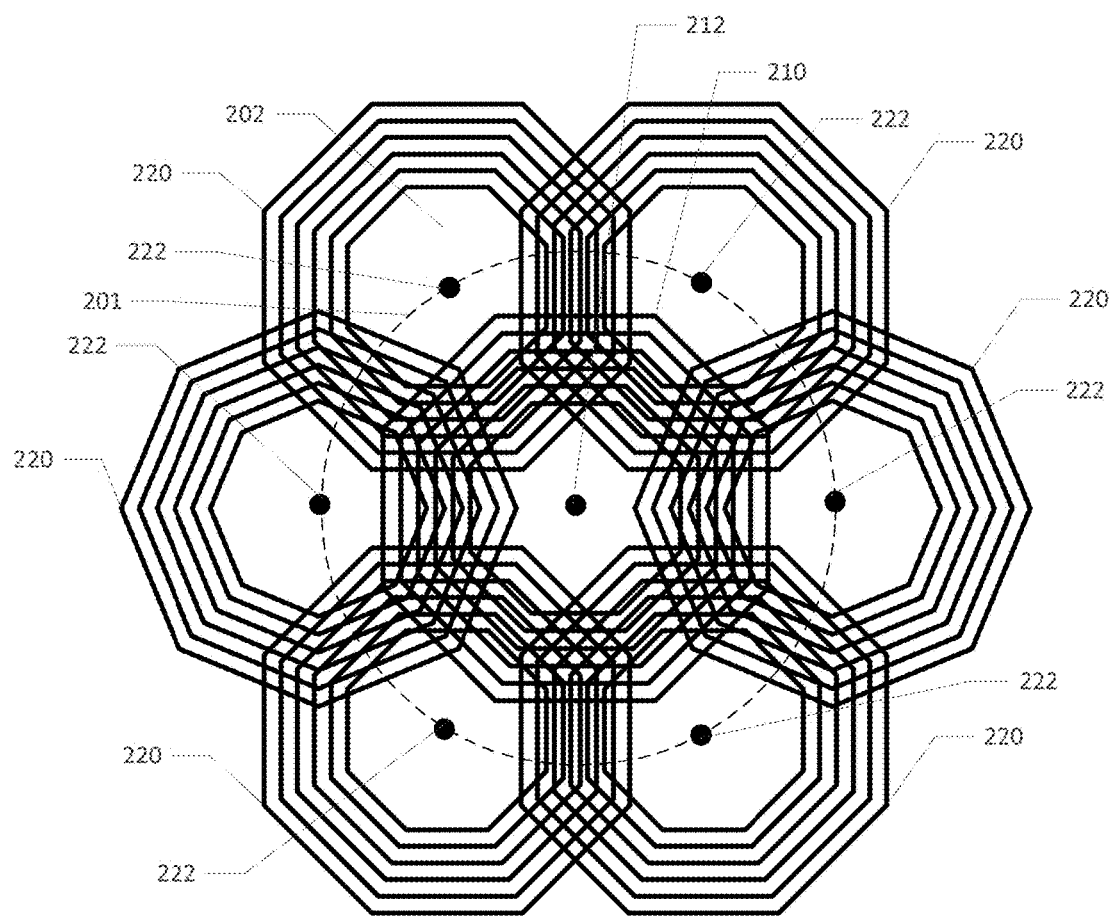
FIG. 2 is a plan view of an example multi-coil array in accordance with the present disclosure when viewed orthogonal to the coils and/or the layers on which the coils are disposed.

Referring to FIG. 2, an example multi-layer array showing seven coils is depicted as viewed orthogonal to the plane of the coils (or the layer on which the coil(s) is/are disposed). In this example, there is one center coil 210 and six exterior coils 220. Each coil has an open area 202 at its center where no portion of the conductive trace is present. As shown in FIG. 2, portions of the exterior coils 220 partially overlap portions of the center coil 210, including overlapping the open area 202 of the center coil 210. Additionally, portions of the exterior coils 220 partially overlap portions of the other exterior coils 220, including the open area 202 of other exterior coils. In some examples, such as the example depicted in FIG. 2, the open area 202 of the center coil 210 has more area overlapped by other coils (i.e., the exterior coils 220) than any other coil in the array. In other words, the remaining open area of the open area 202 of the center coil 110 when taking account of the overlap from the exterior coils 220 (i.e., the portion of the open area 202 that is not overlapped by other coils) is smallest for the center coil 210.

The Q factor of a given coil is also dependent on the magnetic permeability of the environment around the coil. Higher magnetic permeability around the coil leads to a higher Q factor for that coil. Highly conductive materials (e.g., the conductive traces) negatively impact the Q factor because they have very low magnetic permeability. In examples where one coil is partially covered by other coils in the array, the Q factor of the covered coil is negatively impacted (i.e., the Q factor for the covered coil is decreased). In some examples, where the open area 202 of a coil is at least partially covered by another coil, the Q factor for the coil with the at least partially covered open area 202 will have a lower Q factor than a coil with an open area 202 that is not partially covered, or that is less covered. In examples such as that depicted in FIG. 2, the open area 202 of the center coil 210 is covered more than the open area 202 of any of the exterior coils 220. Therefore, in examples such as that depicted in FIG. 2, assuming all coils are sized and shaped the same, and made of the same materials, the center coil 210 has the lowest Q factor in the array.

In an array where one coil has a lower Q factor than other coils in the array, the coil with the lowest Q factor is the limiting factor in the array, rendering the coils with higher Q factors over specified. Therefore, the Q factors of the coils with a higher Q factor can be decreased to achieve a uniform Q factor among all coils in the array. For example, in the array depicted in FIG. 2, as discussed above, the Q factor of the inner coil 210 is lower than the Q factor of the outer coils 220 due to the open area 202 of the inner coil being overlapped (e.g., covered) by the exterior coils 220 more than the open area 202 of any of the exterior coils 220— assuming all coils in the array are made of the same material, shaped the same way, and have the same cross-sectional area. In this example, the outer coils 220 would be over specified since the lower Q factor of the inner coil 210 is the limiting factor of the array. Therefore, the Q factor of the outer coils 220 can be selectively decreased, for example, by decreasing the cross-sectional area of the outer coils 220. Decreasing the cross-sectional area of the outer coils 220 also results in cost savings since less conductive trace material is required to achieve the coil with the decreased cross-sectional area 220. This results in an array with an optimized Q factor amongst the coils in the array while decreasing manufacturing cost of the array by using outer coils 220 with decreased cross-sectional area.

The optimization process described above with respect to FIG. 2 can be applied to any coil array where there is overlap amongst the coils in the array. However, the largest benefit will be achieved in coil arrays with at least three coils. For example, if an array has two coils that are overlapping one another, each coil is overlapping the other coil by the same amount—i.e., the overlap of each coil is equivalent. Therefore, the Q factor change caused by the overlap would be the same in each coil and any cross-sectional area changes to balance the Q factor of the coils would be minimal, if any. The difference in Q factor amongst the coils in a multi-coil array gets more significant when there are at least three coils in the array.

Figure 3A:
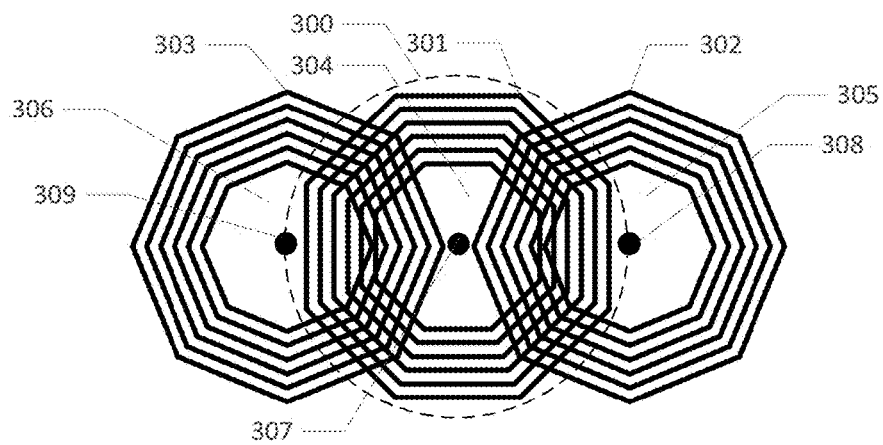
FIG. 3A-3B are plan views of example multi-coil arrays in accordance with the present disclosure when viewed orthogonal to the coils and/or the layers on which the coils are disposed.

FIG. 3A depicts an array with three coils: a first coil 301 having a first open area 304, a second coil 302 having a second open area 305, and an additional coil 303 having an additional open area 306. The second coil 302 at least partially overlaps the first coil 301 and the additional coil 303 also at least partially overlaps the first coil 301 when viewed orthogonal to the coils (or orthogonal to the surface on which the coil is disposed). In some examples, such as that depicted in FIG. 3A, the overlap of the first coil 301 by the second and additional coils 302, 303, causes the remaining open area 304 of the first coil 301 to be less than the remaining open area 305, 306 of either the second or additional coils 302, 303. As described above, in examples where all the coils have the same properties, the Q factor of the first coil 301 will be lower than the Q factor of the second and additional coils 302, 303 due to this overlap. Therefore, to balance the Q factor of the array, the cross-sectional area of the second and additional coils 302, 303 can be decreased relative to the first coil 301. The geometry of the array depicted in FIG. 3A has the second and additional coils 302, 303 placed on opposite sides of the first coil 301 (i.e., 180 degrees apart from each other around the first coil 301). However, other geometries where the second and additional coils 302, 303 are not on opposite sides of the first coil 301 are also possible, such as the second coil 302 and additional coil 303 being 90 degrees apart from each other.

Figure 3B:
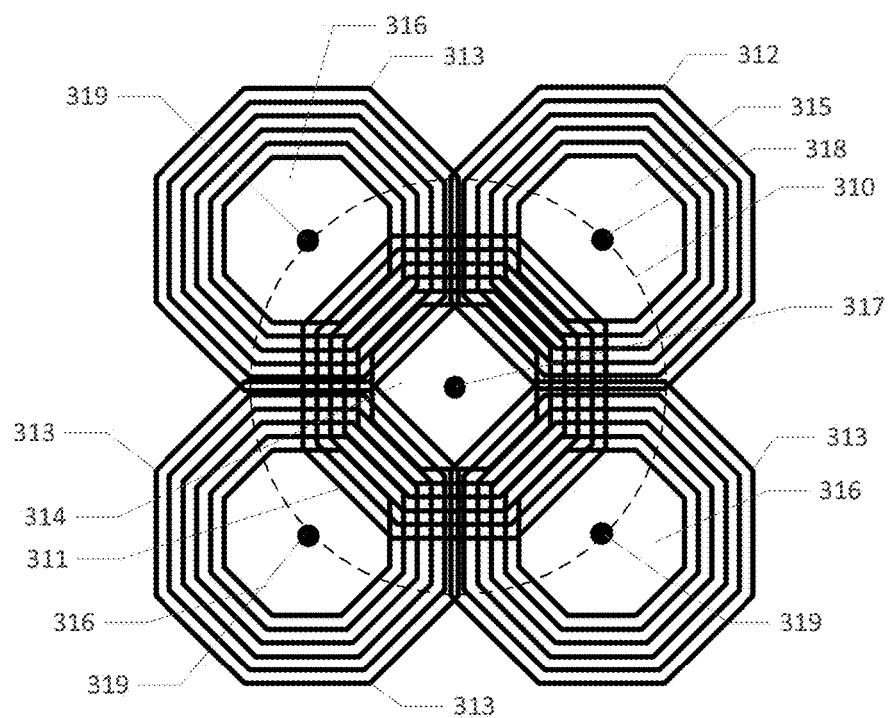

In some examples, the second and additional coils 302, 303 may overlap the first coil 301 substantially equally. In further examples, multi-coil arrays are designed to be geometrically symmetrical, such as the array depicted in FIG. 3A. This geometric symmetry can be applied to an array with any number of outer coils. FIG. 3B, for example, depicts a multi-coil array with five total coils: a first coil 311, a second coil 312, and three additional coils 313. The first coil 311 has a first open area 314, the second coil has a second open area 315, and each additional coil has an additional open area 316. Additionally, the first coil 311 has a first center point 317, the second coil 312 has a second center point 318, and each additional coil 313 has an additional center point 319. The second and additional coils 312, 313 each overlap the first coil 311. In some examples, the second and/or additional coils 312, 313 each overlap the first coil substantially equally. In other examples, the second and additional coils 312, 313 are disposed around the first coil 311 at an equal distance from the first coil 311. For example, the second and additional center points 318, 319 may be located on a circle 310 that has the first center point 317 as its center. In other examples, the second and additional coils 312, 313 surround the first coil 311 in a geometrically symmetrical pattern. For example, in geometrically symmetrical examples where the second and additional center points 318, 319 may be located on a circle 310 that has the first center point 317 as its center, the second and additional center points 318, 319 are disposed at 90 degree intervals around the circle 310. The preceding example of the geometrically symmetrical arrangement of second and additional coils 312, 313 depicted in FIG. 3B was in relation to a five coil array. However, the same concepts may apply to any array with three or more coils (one center coil and at least two surrounding coils). For examples, the following equation can be used to determine the degree interval for an array with "n" coils surrounding the first coil (i.e., "n" coils is equivalent to the total number of second and additional coils):

$$\text{degree interval} = \frac{360°}{n}$$

For example, in a geometrically symmetrical version of FIG. 2, which has one inner coil 210 and six outer coils 220 (e.g., one first coil, one second coil, and five additional coils), which gives "n" equals six, the center point 222 of each outer coil 220 would be disposed at 60 degree intervals along a circle 201 centered at a center point 212 of the inner coil 210. Similarly, for example, in a geometrically symmetrical version of FIG. 3A, which has one first coil 301, one second coil 302, and one third coil 303 (i.e., "n" equals two), a center point 308 of the second coil 302 and a center point 309 of the third coil 303 would be disposed at 180 degree intervals on a circle 300 with a center at a center point 307 of the first coil 301. While the preceding examples have been described and depicted as geometrically symmetrical, this is not a requirement of the present disclosure. Rather, the second and additional coils (i.e., outer coils) may be spaced at any location around the first coil (i.e., center coil) so long as at least a portion of the second and/or additional coils overlap the first coil.

In some examples, cross-sectional areas of the outer coils (e.g., the exterior coils 220 of FIG. 2; the second and additional coil 302, 303 of FIG. 3A; and the second and additional coils 312, 313 of FIG. 3B) are decreased by about 1% to about 60% compared to the cross-sectional area of the inner coil (e.g., the inner coil 210 of FIG. 1; the first coil 301 of FIG. 3A; and the first coil 311 of FIG. 3B). In other words, the cross-sectional areas of the outer coils are about 1% to 60% less than the cross-sectional areas of the inner coils. In other examples, the cross-sectional areas of the outer coils can be about 10% to 30% less than the cross-sectional areas of the inner coils, or more particularly 15% to 25% less than the cross-sectional areas of the inner coils. In further examples, the cross-sectional areas of the outer coils are about 21% to 25% less than the cross-sectional areas of the inner coils. In other examples, the cross-sectional areas of the outer coils are about 17% to 21% less than the cross-sectional areas of the inner coils.

Referring to FIG. 4, a cross sectional view of an example multi-layer array using at least three total coils is depicted. In some examples, the array is placed on a base layer 402 that includes an enhancer material 404 on a top (or first) surface 406 of the base layer 402. Adjacent to the base layer 402 is a first layer 410 having a first coil 412. The first coil 412 is separated from the enhancer material 404 by an insulating material (not shown). Adjacent to the first layer 410, is a second layer 420 having a second coil 422. Adjacent the second layer 420 is a third layer 430 having a third coil 432. In some examples, the enhancer material 404 is a material with high magnetic permeability, for example, with a magnetic permeability of about 3000 μH or more. In some examples, the enhancer material 404 is comprised of a soft ferrite material. The high magnetic permeability of the enhancer material 404 increases the Q factor of the coils in the array. The increase in Q factor will be greater for coils closer to the enhancer material 404. Therefore, in examples such as those depicted in FIG. 4, assuming all coils are sized and shaped the same, and made of the same materials, the first coil 412 will have the largest increase in Q factor due to the enhancer material 404 and the third coil 432 will have the smallest increase in Q factor due to the enhancer material 404, with the increase in Q factor for the second coil 422 falling somewhere between the increase in Q factor for the first coil 412 and the third coil 432. In this example, the Q factor of the third coil 432 is the lowest and therefore the third coil 432 is the limiting factor. Therefore, the cross-sectional area of each of the first coil 412 and second coil 422 can be decreased (by up to approximately 10% or more) to bring the Q factor of those coils closer to the Q factor of the third coil 432 to balance the Q factor of each coil in the array. This allows for the use of less conductive trace material to make the first and second coils 412, 422 compared to the third coil 432, which results in cost savings during the manufacturing process.

Figure 5:
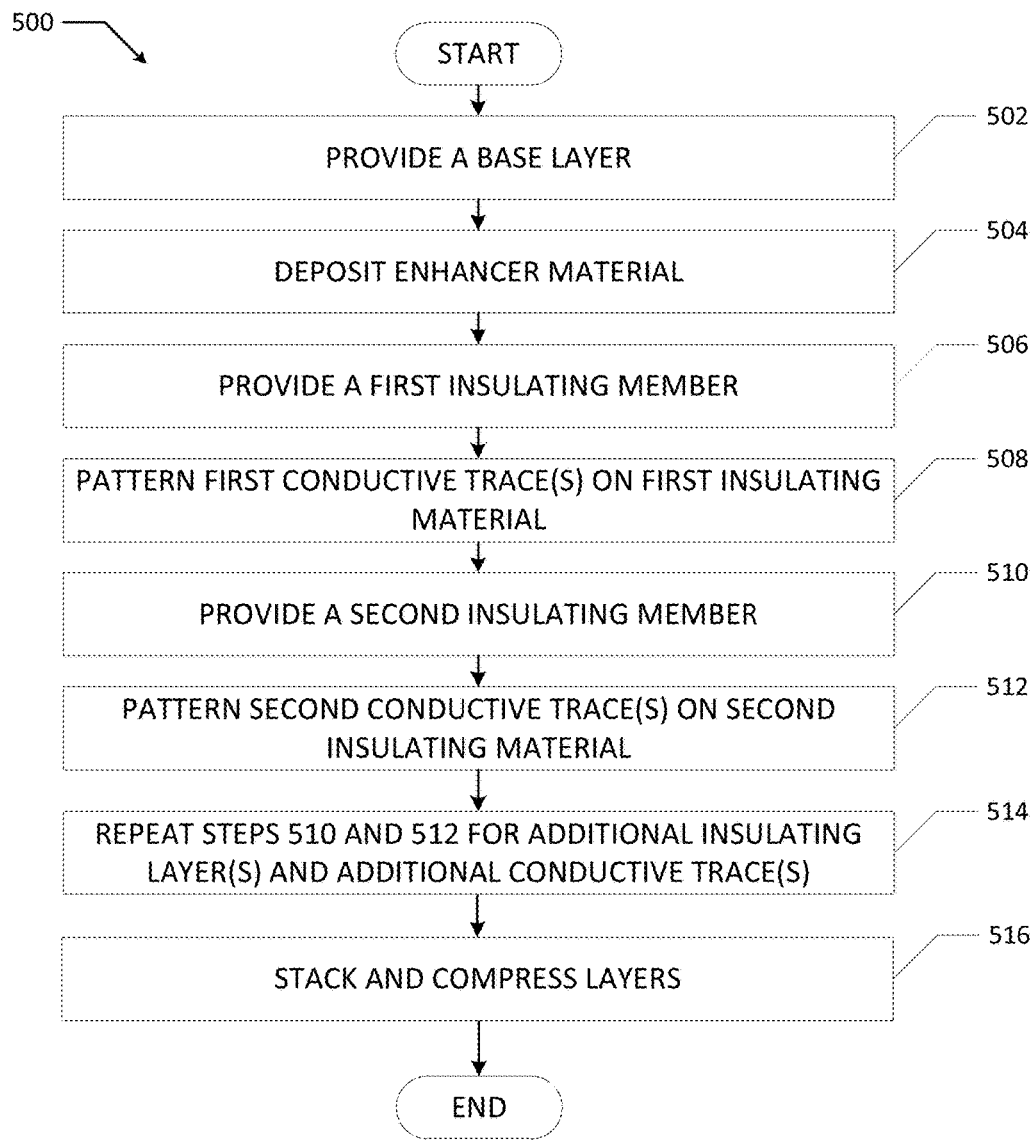
FIG. 5 depicts an example method of fabricating a multi-coil array in accordance with the present disclosure.

FIG. 5 depicts an example method 500 of fabricating a multi-layer array according to the present disclosure. At step 502, a base layer is provided having opposing first and second surfaces. At step 504, an enhancer material is deposited on the second surface of the base layer. The enhancer material deposited t step 504 may have the same characteristics of the enhancer material 404 described with respect to FIG. 4. At step 506, a first insulating material is provided. The first insulating material may have a first surface and an opposing second surface. In some examples, the first insulating material may be a resin impregnated paper layer. In other examples, the first insulating material may be a fiberglass reinforced epoxy or phenolic resin. In some alternative examples, the enhancer material deposited on the base layer at step 504 may alternatively, or additionally, deposited on the first surface of the first insulating material. At step 508 a first conductive trace is patterned onto first insulating material. In some examples, the first conductive trace is patterned onto the second surface of the first insulating material. In further examples, the first conductive trace is patterned on a metal foil, such as, for example, a printed circuit board manufacturing process. In other examples, the first conductive trace is patterned as a printed or extruded conductive ink. In further examples, additional conductive traces may be patterned onto the first conductive trace. At step 510, a second insulating material is provided having opposing first and second surfaces. The second insulating material may be the same material as the first insulating material. At step 512, a second conductive trace is patterned onto the second insulating material. In some examples, the second conductive trace is patterned onto the second surface of the second insulating material. In further examples, the second conductive trace is the same material as the first conductive trace. In additional examples, additional conductive traces may be patterned onto the second conductive trace. At step 514, the steps of providing a second insulating layer 510 and patterning a second conductive trace on the second insulating material 512 may be repeated for however many additional insulating layers and additional conductive traces may be required for the intended conductive trace arrangement in the array.

At step 516, the layers are stacked and compressed. In some examples, the layers are stacked such that the second surface of the base layer is in facing communication with the first surface of the first insulating layer. In further examples, the layers are stacked such that the second surface of the first insulating layer is in facing communication with the first surface of the second insulating layer. In such examples, the first conductive trace may be disposed between the second surface of the first insulating material and the first surface of the second insulating material (i.e., the first conductive trace is disposed between the first insulating material and the second insulating material). In further examples, the layers are stacked such that the second surface of the second insulating material is in facing communication with the first surface of a third insulating material (e.g., one of the additional insulating materials). In such examples, the second conductive trace may be disposed between the second surface of the second insulating material and the first surface of the third insulating material (i.e., the second conductive trace is disposed between the second insulating material and the third insulating material).

Figure 6:
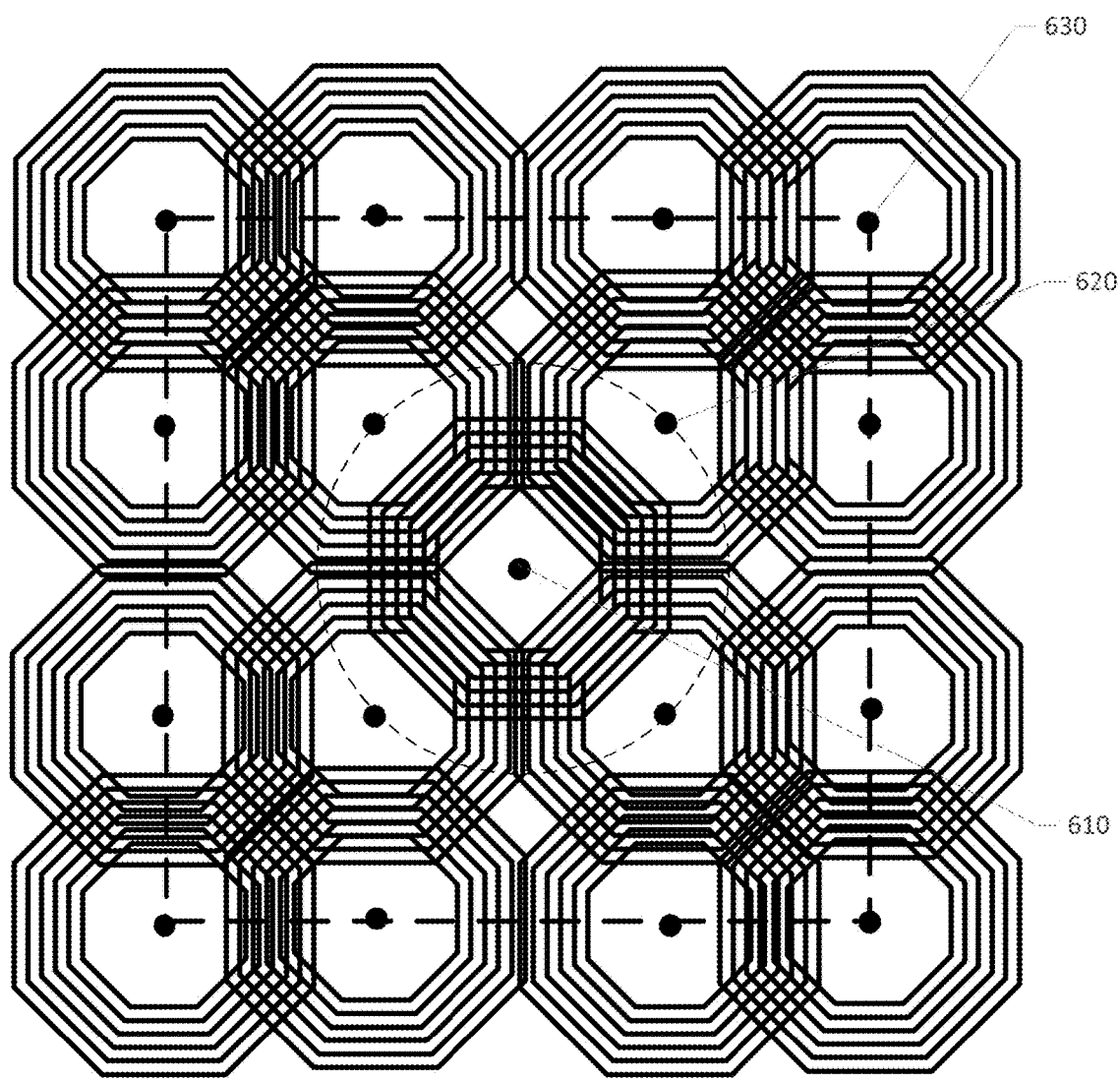
FIG. 6 is a plan view of another example multi-coil array in accordance with the present disclosure when viewed orthogonal to the coils and/or the layers on which the coils are disposed.

FIG. 6 depicts an example with multiple exterior rings of coils where the principles of the present disclosure may also apply. For example, FIG. 6 depicts a center coil 610, a first ring of coils 620, and a second ring of coils 630. In this particular example, the second ring of coils 630 is the outermost ring. In some examples, the outermost ring will have the least amount of overlap from other coils, resulting in less of the open area at the middle of each coil in that ring being covered/overlapped by other coils. As such, the Q factor of those coils will be less impacted than the Q factor of the coils in other interior rings (e.g., the first ring of coils 620) or the center coil 610, which have more of the open area at the middle of each coil covered/overlapped by other coils. Therefore, the cross-sectional area of the coils in the outermost ring (e.g., second ring of coils 630) can be decreased more than the cross-sectional area of the coils in the inner rings (e.g., first ring of coils 620) and the center coil 610. For example, assume 75% of the open area of the center coil is covered/overlapped by other coils (e.g., coils in the first ring of coils 620), 50% of the open area of each coil in the first ring of coils is covered/overlapped by other coils (e.g., coils in the second ring of coils 630 and the center coil 610), and 25% of the open area of each coil in the second ring of coils is covered/overlapped by other coils (e.g., coils in the first ring of coils 620). In such an example, the cross-sectional area of the second ring of coils 630 would be less than the cross-sectional area of the first ring of coils 620, which would less than the cross-sectional area of the center coil 610. In other examples, open areas the inner rings of coils (e.g., the first ring of coils 620) and the center coil 610 are all covered/overlapped by other coils in equivalent amounts. In such examples, only the outermost ring of coils (e.g., the second ring of coils 630) would have coils with decreased cross-sectional areas relative to the coils of the inner rings and the center coil 610.

The invention will now be described in further detail with reference to the following non-limiting example.

EXAMPLES

Example 1

Using an arrangement of coils as depicted in FIG. 2, comparisons are set forth below wherein outer coils were reduced in cross-sectional area at 19% reduction and 23% reduction, with and without a soft ferrite enhancer material disposed between the base layer upper surface and the first coil. The change in Q factor and phase (θ) between the inner and outer coils were calculated as described below:

TABLE 1

| Outer Coil Cross-Sectional Area Change | Without soft ferrite enhancer material ΔInner/Outer Coils | | With soft ferrite enhance material ΔInner/Outer Coils | |
| --- | --- | --- | --- | --- |
| | Q factor | θ | Q factor | θ |
| Uniform loading | −12% | −1.4% | −28% | −2.7% |
| 19% Reduction | 7% | 0.5% | −11% | −1.1% |
| 23% Reduction | 14% | 1.4% | −3% | −0.3% |

In the above Table 1, the term inner coil is used to refer to, for example, the inner coil 210 of FIG. 1; the first coil 301 of FIG. 3A; and the first coil 311 of FIG. 3B, and the term outer coil is used to refer to, for example, the exterior coils 220 of FIG. 2; the second and additional coil 302, 303 of FIG. 3A; and the second and additional coils 312, 313 of FIG. 3B. The outer coil cross-sectional area column sets the amount the cross-sectional area of the outer coil is changed relative to the inner coil. In this column, uniform loading means the outer and inner coils have about the same cross-sectional area. The without soft ferrite enhancer material column indicates the values determined in an embodiment without a soft ferrite enhancer material on the base layer. The with soft ferrite enhancer material column indicates the values determined in an embodiment with a soft ferrite enhancer material on the base layer. The ΔInner/Outer coils columns indicates the change in Q factor and phase (θ) between the inner and outer coils based on the following equation:

$$\Delta \text{Inner/Outer Coils} = \frac{\text{inner coil} - \text{outer coil}}{\text{outer coil}} \times 100\%$$

A balanced array will have a ΔInner/Outer Coils Q factor that approaches 0%. Therefore, in this example, an embodiment with a soft ferrite enhancer material and outer coils that have a cross-sectional area that is 23% less than the inner coil cross-sectional area is nearly fully balanced.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A wireless charging array, comprising:
   a first conductive trace having a first cross-sectional area,
   a second conductive trace having a second cross-sectional area and an interposing insulating member having a first surface and an opposing second surface, and
   wherein the second cross-sectional area is less than the first cross-sectional area.

2. A wireless charging array according to claim 1, wherein the first and second conductive traces comprise meandering lines selected from the group consisting of spirals, spirangles, sawtooth waves, and combinations thereof.

3. The wireless charging array according to claim 1, wherein at least a portion of the second conductive trace overlaps at least a portion of the first conductive trace when viewed orthogonal to the first and second surfaces.

4. The wireless charging array according to claim 1, further comprising at least one additional conductive trace, each of the at least one additional conductive traces having an additional cross-sectional area;
   wherein at least a portion of the second conductive trace and at least a portion of each of the at least one additional conductive traces overlaps at least a portion of the first conductive trace when viewed orthogonal to the first and second surfaces; and
   wherein each additional cross-sectional area is less than the first cross-sectional area.

5. The wireless charging array according to claim 4, wherein the second conductive trace and each of the at least one additional conductive traces are disposed such that the second conductive trace and each of the at least one additional conductive traces overlap the first conductive trace substantially equally.

6. The wireless charging array according to claim 5, wherein the first conductive trace, the second conductive trace, and each of the additional conductive traces comprise a meandering line selected from the group consisting of spirals, spirangles, sawtooth waves, and combinations thereof.

7. The wireless charging array according to claim 4, wherein the second conductive trace and each of the at least one additional conductive traces each has a center point, wherein the first conductive trace has a first center point, and wherein the center points of the second conductive trace and each of the at least one additional conductive traces are located on a circle having the first center point as its center.

8. The wireless charging array according to claim 7, wherein the at least one additional conductive trace comprises three conductive traces; and
   wherein the center points of the second conductive trace and each of the at least one additional conductive traces are located at 90 degree intervals around the circle.

9. The wireless charging array according to claim 4, wherein the at least one additional conductive trace comprises three additional conductive traces.

10. The wireless charging array according to claim 4, wherein the at least one additional conductive trace comprises five additional conductive traces.

11. The wireless charging array according to claim 10, wherein the second conductive trace and each of the at least one additional conductive traces each has a center point, wherein the first conductive trace has a first center point, and wherein the center points of the second conductive trace and each of the at least one additional conductive traces are located on a circle having the first center point as its center; and wherein the center points of the second conductive trace and each of the at least one additional conductive traces are located at 60 degree intervals around the circle.

12. The wireless charging array according to claim 4, wherein each additional cross-sectional area and the second cross-sectional area are about 1% to 60% less than the first cross-sectional area.

13. The wireless charging array according to claim 12, wherein the difference in cross-sectional area is effected by a difference in a thickness of each additional cross-sectional area and the second cross-sectional area.

14. The wireless charging array according to claim 5, wherein each of the additional cross-sectional areas and the second cross-sectional area are about 15% to about 25% less than the first cross-sectional area.

15. The wireless charging array according to claim 4, wherein each additional cross-sectional area and the second cross-sectional area are about 21% to about 25% less than the first cross-sectional area.

16. The wireless charging array according to claim 4, wherein each additional cross-sectional area and the second cross-sectional area are about 17% to about 21% less than the first cross-sectional area.

17. The wireless charging array according to claim 1, further comprising a base layer having opposing first and second surfaces wherein the first conductive trace is in facing communication with the first surface of the base layer and the second surface comprises an enhancer material having a magnetic permeability of about 3000 µH or more.

18. The wireless charging array according to claim 17, wherein the enhancer material comprises a soft ferrite material.

19. The wireless charging array according to claim 1, wherein the first conductive trace and the second conductive trace comprise a metal foil.

20. The wireless charging array according to claim 1, wherein the first conductive trace and the second conductive trace comprise a printed conductive ink.

21. A method of forming a wireless charging array, the method comprising:

providing a first insulating member having a first surface and an opposing second surface;

patterning a first conductive trace on the second surface of the first insulating member;

providing a second insulating member having a first surface and an opposing second surface;

patterning a second conductive trace on the second surface of the second insulating member;

stacking and compressing the first insulating member, the second insulating member and a third insulating member such that the first conductive trace is disposed between the second surface of the first insulating member and the first surface of the second insulating member, and the second conductive trace is disposed between the second surface of the second insulating member and the third insulating member; and wherein the first conductive trace has a first cross-sectional area that is different from a second cross-sectional area of the second conductive trace.

22. The method according to claim 21, wherein the first insulating member and the second insulating member each comprises a resin impregnated layer.

23. The method of claim 21, further comprising providing an enhancer material disposed on a base, the base located on the first surface side of the first insulating material when stacked and compressed with the first, second, and third insulating materials.

24. The method of claim 23, wherein the enhancer material comprises a soft ferrite.

25. The method of claim 23, wherein the first cross-sectional area is less than the second cross-sectional area.

26. The method of claim 21, wherein the first cross-sectional area is greater than the second cross-sectional area.

* * * * *